United States Patent Office 3,344,094
Patented Sept. 26, 1967

3,344,094
DRY MIX FRICTION MATERIAL COMPRISING BUTADIENE ACRYLONITRILE RUBBER, PHENOL FORMALDEHYDE RESIN AND FILLER
Charles Louis Ernest de Gaugue, Califon, N.J., assignor to Johns-Manville Corporation, New York, N.Y., a corporation of New York
No Drawing. Filed Jan. 21, 1965, Ser. No. 427,174
6 Claims. (Cl. 260—5)

ABSTRACT OF THE DISCLOSURE

A dry mix prepared friction material, and method of producing, including a binder composition of phenol-formaldehyde resin and butadiene acrylonitrile rubber copolymer.

---

This invention relates to a novel friction product, and method of producing the same, having improved properties.

Typical friction materials prepared by means of the relatively inexpensive and common manufacturing procedure of combining and dry mixing the constituents exhibit optimum physical strength and frictional properties and in these categories are decidely superior to comparable products or materials comprising like ingredients which are wet mixed or prepared in their manufacture. However, dry mix formed or produced friction products normally exhibit a rate of wear which is appreciably greater and inferior to that of comparable products prepared by wet mixing procedures.

It is a primary object of this invention to provide a friction material composition which is amenable to dry mix manufacturing procedures retaining the high physical strength and frictional properties characteristic of dry mix prepared products, and additionally possesses an improved rate of wear and service life commensurate with wet mix produced products.

It is also an object of this invention to provide an economical means and procedure for the manufacture of improved friction materials and products thereof exhibiting optimum service life.

It is a further object of this invention to provide a novel friction material composition which can be economically employed in the manufacture of brake blocks having overall outstanding properties rendering them uniquely advantageous in the friction material service.

This invention comprises improved friction materials, or brake products thereof, comprising a novel combination of specific ingredients and the relative proportions thereof, which are amenable to low cost dry mix manufacturing procedures, and in which the total cooperative effects of the admixing or preparation and of the overall interaction and combined function of the combination produce a composition which possesses optimum properties for a friction product and in particular strength, friction characteristics and long wear life.

The friction material, or more specifically the combination and ratio of components of this invention responsible for the decided advantages thereof both in economy and in performance consists essentially of the ingredients given below in both the broad ranges of proportions defining the approximate scope of the invention and in the preferred proportions setting forth the composition exhibiting optimum effects. The relative proportions of components constituting the combination of the friction composition of this invention are given in the approximate percentages by weight of the total thereof.

| Ingredient | Broad, percent | Prefered, percent |
|---|---|---|
| Phenol-formaldehyde resin | 7–12 | 9–11 |
| Butadiene acrylonitrile rubber copolymer | 3–8 | 4–6 |
| Sulfur | 0–3 | 1–3 |
| Zinc oxide | 1–6 | 2–4 |
| Carbon black | 1–3.5 | 1–3 |
| Graphite | 1–3.5 | 1–3 |
| Copper based alloy (minus 20 mesh) | 2–8 | 3–6 |
| Barytes | 5–10 | 6–9 |
| Tire peelings—ground | 5–10 | 6–9 |
| Hard rubber friction particles | 15–35 | 20–30 |
| Asbestos fiber | 20–40 | 25–37 |

Referring to the respective ingredients, the phenolic resin, as is evident in the friction material art, should consist of a type which can be cured to a permanently insoluble and fusible product and preferably is of high heat resistance. Additionally the resin should be selected on the basis of its compatibility with the rubber system. The butadiene acrylonitrile copolymer elastomer, which comprises the binder phase or matrix, should also consist of one of the more heat resistant types and preferably comprises such an elastomer of relatively high acrylonitrile content. These preferred or desirable properties of the resin and/or rubber, or the types thereof possessing the same, are available in the literature or from vendors specifications.

The copper based alloy comprises any one or a combination of the common or relatively soft brasses and/or bronzes, for example, a copper based alloy having a Brinell hardness of about 75 to about 150. Tire peelings are obtainable from common automotive carcasses ground to a suitable size as for example minus 20 mesh. The hard friction particles consist of any hard rubber containing high ratios of a thermosetting resin and/or inorganic fillers. These friction fillers are common in the friction material art and may comprise commercial, cured ground hard rubber. Examples of suitable hard rubber friction fillers are illustrated in U.S. Letters Patent No. 2,861,964.

In formulating a composition of the invention within the prescribed ranges, it has been found generally desirable to proportion the relative ingredients so as to provide a total bond, or curable rubber and resin content exclusive of the rubber and resin content of the tire peelings and friction particles of about 10 to 20 percent by weight of the total formulation with the rubber content of said bond being about 20 to 50 percent by weight of the overall binder phase or matrix. Also, the inclusion of sulfur, although not necessary, is highly preferred for vulcanization of the elastomer and can be present in amounts up to about 50 percent by weight of the rubber components of the binder phase.

Dry mix manufacturing procedures suitable for the production of the subject friction material compositions comprise in general and in keeping with the techniques of the art, a relatively simple and economical dry mixing or blending of all components to substantial uniformity, consolidating and shaping to a block of design density and configuration by hot pressing in an aptly shaped and dimensioned mold, and continuing the thermal cure of the resin and rubber binder phase initiated in the press in an oven. To facilitate mixing, a preblending of the rubber and resin is frequently useful. Consolidation pressures and temperatures may extend for example, depending upon the curing conditions of the binder phase and the characteristics of the other components, from about 10 to 50 minutes at about 1000 p.s.i. to about 5000 p.s.i. and temperatures of about 250 to 350° F. The final or completion of the thermal cure initiated in the molding procedure should be carried to the point of substantial completion for the particular heat curable rubber and/or resin in accordance with its requirements to provide a hard, rigid, infusible stable product suitable for braking application, for example temperature of from about 200 to about 350° F. for at least 1 up to about 24 hours or more if necessary. Thermally curing conditions for these rubber and resins are known in the art or available in the literature or from the vendor.

*Example I*

Brake block consisting of the following combination of components, in percentage by weight of the following:

| Ingredients | Percent | Unit Batch | |
|---|---|---|---|
| | | Lbs. | Oz. |
| Phenol-formaldehyde resin (Durez No. 1400 Durez Plastics and Chemicals, Inc.) | 9.80 | 3 | 2 |
| Butadiene acrylonitrile rubber, powdered (Hycar No. 1411 B. F. Goodrich Co.) | 4.90 | 1 | 9 |
| Sulfur | 1.96 | 0 | 10 |
| Zinc oxide | 3.92 | 1 | 4 |
| Carbon black | 1.96 | 0 | 10 |
| Graphite | 1.96 | 0 | 10 |
| Brass chips | 3.92 | 1 | 4 |
| Barytes | 7.84 | 2 | 8 |
| Tire peelings, ground to minus 20 mesh | 7.84 | 2 | 8 |
| Hard rubber friction particles, minus 35 mesh* | 23.52 | 7 | 8 |
| Asbestos fiber | 32.38 | 10 | 5 |

*Commercial, fully cured, ground hard rubber duct, either of natural rubber or synthetic comprising butadiene-styrene and butadiene-acrylonitrile.

were prepared by premixing the butadiene acrylonitrile rubber elastomer, phenolic resin and zinc oxide in a horizontal agitator, then adding the balance of the components and mixing all dry for 20 minutes. From this stock admixture, brake blocks were molded and press cured by consolidating at 2000 p.s.i. for 20 minutes with three 2 minute breathing intervals. Press platen steam pressures and temperatures were varied for different samples and the respective pressure and molding temperatures applied consisted either of 60 pounds steam pressure and 255 to 265° F., 90 pounds steam pressure and 280 to 285° F., or about 120 pounds steam pressure and 290 to 300° F. All brake blocks formed were trimmed and post cured in an air circulating oven at 1 hour to reach 300° F. and 12 hours at 300° F. A number of samples of the foregoing produced brake block, sized 16½ inch x 7 inch for a Timkin automotive brake unit were compared under the same test conditions with dry mix manufacture commercial brake block to determine the relative wear life of each. The prior dry mixed brake block composition comprising the standard consisted, in percent by weight, of: phenolic resin 12.5 percent; carbon black, 1.3 percent; graphite, 2.8 percent; brass chips, 4.4 percent; hard rubber friction particles, 43.0 percent; asbestos fiber, 35.0 percent, with all ingredients being dry mixed and molded under comparable conditions to that of the foregoing example. The wear loss per 4500 stops at 40 miles per hour for the products of Example I of this invention, range between 170 to 182 grams with an average for all samples tested of 176 grams, whereas the standard when subjected to the same conditions of wear loss after 4500 stops at 40 miles per hour, exhibited a weight loss of between 185 to 281 grams and an average of 237 grams. Specifically the product of this invention provided an improvement in wear life over that of a prior standard product which amounts to a 28 percent increase in mileage service.

A further example of the novel combination of this invention prepared according to the same means and conditions of the products of Example I, comprises, in percent by weight of the total:

| Ingredients | Percent | Unit Batch | |
|---|---|---|---|
| | | Lbs. | Oz. |
| Phenol-formaldehyde resin (Durez No. 12687 Durez Plastics and Chemicals, Inc.) | 10.2 | 10 | 0 |
| Butadiene acrylonitrile rubber, copolymer, powdered (Hycar No. 1411, B. F. Goodrich Co.) | 5.1 | 5 | 0 |
| Zinc oxide | 2.0 | 2 | 0 |
| Carbon black | 2.0 | 2 | 0 |
| Graphite | 2.0 | 2 | 0 |
| Brass chips (minus 20 mesh) | 4.1 | 4 | 0 |
| Barytes | 8.2 | 8 | 0 |
| Tire peelings, ground to minus 20 mesh | 8.2 | 8 | 0 |
| Friction particles, hard rubber (minus 35 mesh)* | 24.5 | 24 | 0 |
| Asbestos fiber | 33.7 | 33 | 0 |

*Commerical, fully cured, ground hard rubber duct either natural rubber or synthetic comprising butadiene-styrene and butadiene-acrylonitrile.

It will be understood that the foregoing details are given for purposes of illustration and not restriction, and that variations within the spirit of this invention are to be included within the scope of the appended claims.

What I claim is:

1. A dry mix prepared friction material of improved wear life consisting essentially of, in approximate percentages by weight:

| | Percent |
|---|---|
| Phenol - formaldehyde thermosetting resin | 7 to 12 |
| Butadiene acrylonitrile rubber | 3 to 8 |
| Sulfur | 0 to 3 |
| Zinc oxide | 1 to 6 |
| Carbon black | 1 to 3.5 |
| Graphite | 1 to 3.5 |
| Copper based alloy | 2 to 8 |
| Barytes | 5 to 10 |
| Tire peelings, ground | 5 to 10 |
| Hard rubber friction particles | 15 to 35 |
| Asbestos fiber | 20 to 40 |

2. A dry mix prepared friction material of improved wear life consisting essentially of, in approximate percentages by weight:

| | Percent |
|---|---|
| Phenol - formaldehyde thermosetting resin | 9 to 11 |
| Butadiene acrylonitrile rubber | 4 to 6 |
| Sulfur | 1 to 3 |
| Zinc oxide | 2 to 4 |
| Carbon black | 1 to 3 |
| Graphite | 1 to 3 |
| Copper based alloy, chips | 3 to 6 |
| Barytes | 6 to 9 |
| Tire peelings, ground | 6 to 9 |
| Hard rubber friction particles | 20 to 30 |
| Asbestos fiber | 25 to 37 |

3. A friction material of improved wear life comprising the product of dry mixing and consolidating an admixture consisting essentially of, in approximate percentages by weight:

|   | Percent |
|---|---|
| Phenol-formaldehyde thermosetting resin | 9.80 |
| Butadiene acrylonitrile rubber | 4.90 |
| Sulfur | 1.96 |
| Zinc oxide | 3.92 |
| Carbon black | 1.96 |
| Graphite | 1.96 |
| Brass chips | 3.92 |
| Barytes | 7.84 |
| Tire peelings, ground | 7.84 |
| Hard rubber friction particles | 23.52 |
| Asbestos fiber | 32.38 | then curing the resin and rubber content thereof.

4. A friction material of improved wear life comprising the product of dry mixing and consolidating an admixture consisting essentially of, in approximate percentages by weight:

|   | Percent |
|---|---|
| Phenol-formaldehyde thermosetting resin | 10.2 |
| Butadiene acrylonitrile rubber | 5.1 |
| Zinc oxide | 2.0 |
| Carbon black | 2.0 |
| Graphite | 2.0 |
| Brass chips | 4.1 |
| Barytes | 8.2 |
| Tire peelings, ground | 8.2 |
| Hard rubber friction particles | 24.5 |
| Asbestos fiber | 33.7 | then curing the resin and rubber content thereof.

5. The method of producing a friction material having improved wear properties comprising dry mixing a batch of ingredients consisting essentially of, in approximate percentages by weight:

|   | Percent |
|---|---|
| Phenol - formaldehyde thermosetting resin | 7 to 12 |
| Butadiene acrylonitrile rubber | 3 to 8 |
| Sulfur | 0 to 3 |
| Zinc oxide | 1 to 6 |
| Carbon black | 1 to 3.5 |
| Graphite | 1 to 3.5 |
| Copper based alloy | 2 to 8 |
| Barytes | 5 to 10 |
| Tire peelings, ground | 5 to 10 |
| Hard rubber friction particles | 15 to 35 |
| Asbestos fiber | 20 to 40 | molding and pressing the admixed ingredients to shape and consolidating the same, then thermally curing the curable rubber and resin content.

6. The method of producing a friction material having improved wear properties comprising dry mixing a batch of ingredients consisting essentially of, in approximate percentages by weight:

|   | Percent |
|---|---|
| Phenol - formaldehyde thermosetting resin | 9 to 11 |
| Butadiene acrylonitrile rubber | 4 to 6 |
| Sulfur | 1 to 3 |
| Zinc oxide | 2 to 4 |
| Carbon black | 1 to 3 |
| Graphite | 1 to 3 |
| Copper based alloy, chips | 3 to 6 |
| Barytes | 6 to 9 |
| Tire peelings, ground | 6 to 9 |
| Hard rubber friction particles | 20 to 30 |
| Asbestos fiber | 25 to 37 | to uniformly disperse the same, molding and pressing the admixed ingredients at pressures of about 1000 to about 5000 p.s.i. and temperatures of about 250 to about 350° F. for about 10 to 50 minutes to shape and consolidate the same, then thermally curing the curable rubber and resin content by maintaining the same at a temperature of about 200 to about 350° F. for at least 1 hour to about 24 hours.

References Cited
UNITED STATES PATENTS

| 2,885,379 | 5/1959 | Taylor et al. | 260—845 |
| 3,092,595 | 6/1964 | Smith et al. | 260—4 |

FOREIGN PATENTS

| 461,387 | 11/1949 | Canada. |

MURRAY TILLMAN, *Primary Examiner.*

M. J. TULLY, *Assistant Examiner.*